United States Patent
Kim et al.

(10) Patent No.: US 9,001,193 B2
(45) Date of Patent: Apr. 7, 2015

(54) APPARATUS, METHOD AND SYSTEM FOR SYNCHRONIZATION AND 3D DISPLAY APPARATUS USING THE SAME

(75) Inventors: Hyung-rae Kim, Seoul (KR); Yoon-soon Ahn, Seoul (KR); Tae-Don Hwang, Suwon-si (KR); Joon-hyun Yang, Suwon-si (KR); Tae-hyeun Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 12/980,401

(22) Filed: Dec. 29, 2010

(65) Prior Publication Data
US 2011/0234771 A1 Sep. 29, 2011

Related U.S. Application Data

(60) Provisional application No. 61/316,520, filed on Mar. 23, 2010.

(30) Foreign Application Priority Data

May 6, 2010 (KR) .................. 10-2010-0042541

(51) Int. Cl.
*H04N 13/04* (2006.01)
(52) U.S. Cl.
CPC ....... *H04N 13/0497* (2013.01); *H04N 13/0438* (2013.01)

(58) Field of Classification Search
USPC .......................................... 348/53
See application file for complete search history.

(56) References Cited

U.S. PATENT DOCUMENTS

| 3,647,953 | A * | 3/1972 | Booker et al. | 360/79 |
| 5,189,461 | A * | 2/1993 | Ishiguro | 396/102 |
| 5,274,415 | A * | 12/1993 | Ishiguro | 396/128 |
| 5,479,185 | A * | 12/1995 | Biverot | 345/6 |
| 6,088,052 | A * | 7/2000 | Guralnick | 348/51 |
| 7,855,521 | B2 * | 12/2010 | Otaguro | 318/4 |
| 2005/0237394 | A1 * | 10/2005 | Katiblan et al. | 348/226.1 |
| 2008/0252238 | A1 * | 10/2008 | Otaguro | 318/400.05 |
| 2009/0051759 | A1 * | 2/2009 | Adkins et al. | 348/53 |
| 2010/0157028 | A1 * | 6/2010 | MacNaughton et al. | 348/53 |

* cited by examiner

*Primary Examiner* — Sath V Perungavoor
*Assistant Examiner* — Kehinde O Abimbola
(74) *Attorney, Agent, or Firm* — Sughrue Mion, PLLC

(57) ABSTRACT

Apparatus, method, and system for synchronization and a three-dimensional (3D) display apparatus using the same are provided. The 3D display apparatus includes: a power generator which generates power based on a received alternating current (AC) power signal, a detector which detects zero crossing points of time of the received AC power signal, and a controller which generates a reference signal based on the detected zero crossing points of time and transmits the reference signal to at least one other 3D display apparatus.

26 Claims, 14 Drawing Sheets

APPARATUS, METHOD AND SYSTEM FOR SYNCHRONIZATION AND 3D DISPLAY APPARATUS USING THE SAME

CROSS-REFERENCE TO RELATED APPLICATIONS

This application claims priority from U.S. Provisional Application No. 61/316, 520, filed on Mar. 23, 2010 in the United States Patent and Trademark Office, and Korean Patent Application No. 10-2010-0042541, filed on May 6, 2010 in the Korean Intellectual Property Office, the disclosures of which are incorporated herein by reference in their entirety.

BACKGROUND

1. Field

Apparatuses, methods, and systems consistent with exemplary embodiments relate to synchronization of a three-dimensional (3D) display apparatus, and more particularly, to synchronizing a plurality of display apparatuses.

2. Description of the Related Art

With the development of 3D technologies, diverse types of devices applying the 3D image technologies are coming into existence. Examples of such devices are 3D manufacturing devices such as 3D cameras, 3D televisions (TVs) for watching a 3D image, and 3D eyeglasses for realizing a stereoscopic image in association with a 3D TV.

In recent years, entertainment contents such as movies and documentaries are manufactured with 3D technologies. Also, many entertainment companies are keen on developing 3D contents and many manufacturers for manufacturing 3D display apparatuses are competing for the preoccupancy of 3D technologies.

As the 3D display apparatuses have been popularized already, users' demands for improvement in 3D image quality and convenience when watching the 3D image has been further increased.

The elements that play an important role in the system that allows a user to watch a 3D image at home may include a 3D display apparatus such as a 3D TV and 3D eyeglasses operating in association with the 3D display apparatus for realizing a stereoscopic image.

In order to realize the stereoscopic image, the 3D display apparatus and the 3D eyeglasses should be synchronized with each other. That is, when a timing at which the 3D display apparatus outputs an image is synchronized with timings at which left-eye/right-eye shutters of the 3D eyeglasses are opened or closed, a user wearing the 3D eyeglasses perceives a stereoscopic image from the 3D image output from the 3D display apparatus.

The synchronization between the 3D display apparatus and the 3D eyeglasses is particularly problematic in the case of a single 3D display apparatus and a single pair of 3D eyeglasses, but it is difficult to achieve in the case of a plurality of 3D display apparatuses. That is, if a 3D image is output from a plurality of display apparatuses that are not synchronized, the user may not enjoy the 3D image properly. This problem could occur, for example, when a plurality of 3D display apparatuses are displayed in a department store.

SUMMARY

Exemplary embodiments overcome the above disadvantages and other disadvantages not described above. However, it is understood that an exemplary embodiment is not required to overcome the disadvantages described above, and an exemplary embodiment may not overcome any of the problems described above.

One or more exemplary embodiments provide an apparatus, method, and system for synchronization, which are capable of synchronizing a plurality of 3D display apparatuses and outputting an image, and a 3D display apparatus using the same.

One or more exemplary embodiments also provide an apparatus, method, and system for synchronization, which are capable of synchronizing timings of opening and closing shutters of a plurality of pairs of 3D eyeglasses, which operate in association with a plurality of 3D display apparatuses, and a 3D display apparatus using the same.

According to an aspect of an exemplary embodiment, a 3D display apparatus includes: a power generator which generates power based on received alternating current (AC) power, a detector which detects zero crossing points of time of the received AC power, and a controller which generates a reference signal based on the detected zero crossing points of time and transmits the reference signal to at least one other 3D display apparatus.

The reference signal may correspond to the detected zero crossing points of time.

The controller may output an image based on the reference signal.

The controller may generate a sync signal for synchronizing a timing of opening and closing shutters of 3D eyeglasses based on the reference signal, and may transmit the sync signal to the 3D eyeglasses.

The reference signal may be a signal for synchronizing a timing of outputting an image at the at least one other 3D display apparatus.

The reference signal may be a signal for synchronizing shutters of a pair of 3D eyeglasses operating in association with the at least one other 3D display apparatus.

According to an aspect of another exemplary embodiment, a synchronization apparatus includes: a power generator which generates power based on received AC power, a detector which detects zero crossing points of time of the received AC power, and a controller which generates a reference signal for synchronizing timings of outputting images of a plurality of 3D display apparatuses based on the detected zero crossing points of time, and transmits the reference signal to the plurality of 3D display apparatuses.

The reference signal may correspond to the zero crossing points of time.

The synchronization apparatus may further include a sync signal generator which generates a sync signal for synchronizing display timings of the plurality of 3D display apparatuses with timings of opening and closing shutters of at least one pair of 3D eyeglasses, and the controller may transmit the generated sync signal to the at least one pair of 3D eyeglasses.

According to an aspect of another exemplary embodiment, a synchronization method includes: receiving AC power, detecting zero crossing points of time of the AC power, generating a reference signal based on the detected zero crossing points of time, and transmitting the reference signal to at least one display apparatus.

The reference signal may correspond to the detected zero crossing points of time.

The reference signal may be a signal for synchronizing a timing of outputting an image at the at least one 3D display apparatus.

The synchronization method may further include generating a sync signal for synchronizing a display timing of the at least one 3D display apparatus with a timing of opening and closing shutters of at least one pair of 3D eyeglasses operating in association with the at least one 3D display apparatus based on the reference signal, and the transmitting may include transmitting the generated sync signal to the at least one pair of 3D eyeglasses.

The sync signal may correspond to the zero crossing points of time.

The synchronization method may further include: a display device receiving a reference signal from an external source, and displaying a 3D image based on the received reference signal.

According to an aspect of another exemplary embodiment, a synchronization system includes: a first display apparatus which generates a reference signal based on zero crossing points of time of a received AC power signal, and transmits the generated reference signal, and a second display apparatus which receives the reference signal transmitted from the first display apparatus and displays an image based on the received reference signal.

The reference signal may be a signal for synchronizing an image display timing of the first display apparatus with an image display timing of the second display apparatus.

The first display apparatus may generate a sync signal for synchronizing timings of opening and closing shutters of at least one pair of 3D eyeglasses operating in association with one of the first display apparatus and the second display apparatus based on the reference signal, and transmits the sync signal to the at least one pair of 3D eyeglasses.

The second display apparatus may generate a sync signal for synchronizing timings of opening and closing shutters of at least one pair of 3D eyeglasses operating in association with one of the first display apparatus and the second display apparatus based on the reference signal, and transmit the sync signal to the at least one pair of 3D eyeglasses.

The first display apparatus and the second display apparatus may be display apparatuses to display a 3D image, and the image may be a 3D image.

BRIEF DESCRIPTION OF THE DRAWING FIGURES

The above and/or other aspects will be more apparent by describing in detail exemplary embodiments, with reference to the accompanying drawings in which.

DETAILED DESCRIPTION OF EXEMPLARY EMBODIMENTS

Figure 1:
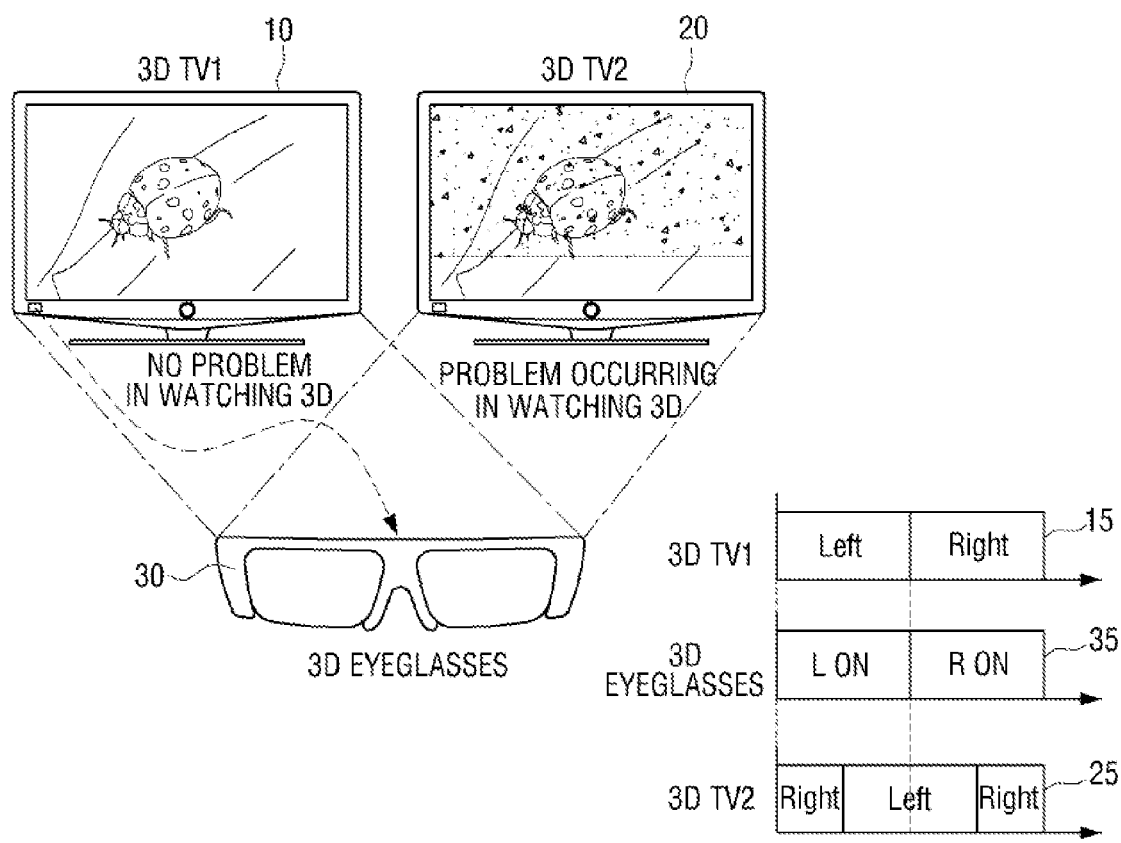
FIG. 1 is a view to explain a problem to be solved by the present disclosure.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the inventive concept. Thus, it is apparent that the exemplary embodiments can be carried out without those specifically defined matters. Also, functions or elements known in the related art are not described in detail since they would obscure the exemplary embodiments with unnecessary detail. Expression such as "at least one of," when preceding a list of elements, modify the entire list and not the individual elements of the list.

FIG. 1 is a view to explain a problem to be solved by the present disclosure. As shown in FIG. 1, there are a plurality of 3D TVs 10, 20 and a single pair of 3D eyeglasses 30 which is synchronized with the 3D TV1 10. The 3D eyeglasses 30 open only a left-eye shutter at a timing that a left-eye image is output from the 3D TV1 10 and open only a right-eye shutter at a timing that a right-eye image is output from the 3D TV1 10, so that a user can enjoy a stereoscopic image.

However, although the 3D TV2 20 outputs the same image as that of the 3D TV1 10, since the timing of outputting the image at the 3D TV2 20 is not synchronized with the timing of opening and closing the shutters of the 3D eyeglasses 30, it is difficult for the user to watch the 3D image output from the 3D TV2 20 with the 3D eyeglasses 30.

Referring to a graph illustrated in FIG. 1, since the timing 15 of outputting the 3D image at the 3D TV1 10 and the timing 25 of outputting the 3D image at the 3D TV2 20 are different from each other and the timing 35 of opening and closing the shutters of the 3D eyeglasses 30 is synchronized with the timing 15 of outputting the 3D image at the 3D TV1 10, the image output from the 3D TV2 20 is viewed as a distorted image.

Figure 2:
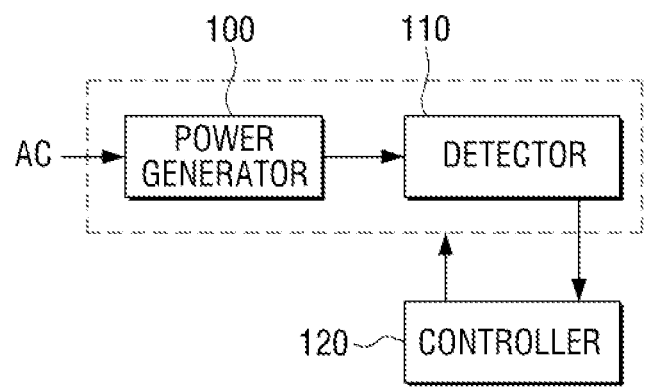
FIG. 2 is a block diagram illustrating a synchronization apparatus according to an exemplary embodiment.

FIG. 2 is a block diagram illustrating a synchronization apparatus to solve the above-mentioned problem according to an exemplary embodiment.

The synchronization apparatus according to an exemplary embodiment includes a power generator 100, a detector 110, and a controller 120.

The power generator 100 generates power based on an input alternating current (AC) signal and supplies the power.

The detector 110 detects zero crossing points of time of the AC power signal input from the power generator 100. The zero crossing point of time of the AC power signal refers to a point of time at which the AC voltage is 0V at a moment when the AC voltage changes from positive (+) to negative (−) or from − to +. In other words, the detector 110 detects a point of time at which the AC power signal periodically changing is 0V.

In order to detect the zero crossing points of time, a related-art zero crossing detection circuit using various methods known in the related art may be employed. This is obvious to an ordinary skilled person in the related art and thus a detailed description thereof is omitted.

The controller 120 generates a reference signal based on the zero crossing point of time detected by the detector 110, and transmits the reference signal to an external apparatus.

More specifically, the reference signal may be set for all of the zero crossing points of time or may set for a specific point of time of a predetermined period. That is, the reference signal may be generated at some points of time of the zero crossing points of time.

The reference signal generated and transmitted from the controller 120 is a signal for synchronizing a timing of outputting an image at a display apparatus which receives it.

The synchronization apparatus shown in FIG. 2 may exist solely or may be applied to another electronic apparatus including the power generator 100, such as a 2D or 3D display apparatus. Hereinafter, a display apparatus including the synchronization apparatus of FIG. 2 will be described in detail.

Figure 3:
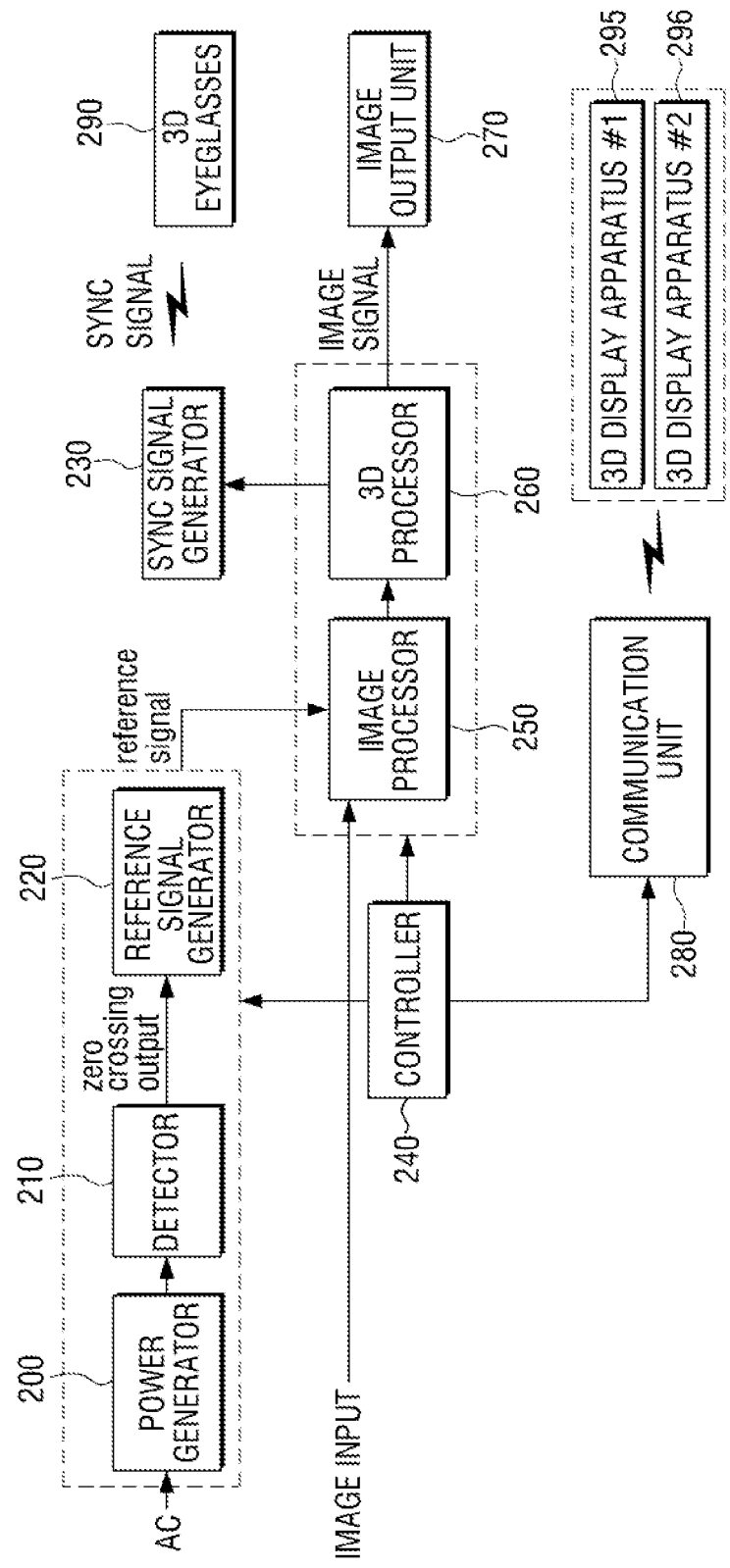
FIG. 3 is a block diagram illustrating a 3D display apparatus according to an exemplary embodiment.

FIG. 3 is a block diagram illustrating a 3D display apparatus according to an exemplary embodiment. The 3D display apparatus according to an exemplary embodiment includes a power generator 200, a detector 210, a reference signal generator 220, a synchronization (sync) signal generator 230, a controller 240, an image processor 250, a 3D processor 260, an image output unit 270, and a communication unit 280.

The power generator 200 and the detector 210 are the same as those described above. The reference signal generator 220 is controlled by the controller 240 to generate a reference signal from a zero crossing point of time detected by the detector 210. The reference signal generator 220 is a separate element in this exemplary embodiment, but it may be omitted if the zero crossing point of time detected by the detector 210 is set as a reference signal.

The image processor 250 receives the reference signal and an image and transmits the reference signal and the image to the 3D processor 260. The 3D processor 260 processes an image signal to alternately output a left-eye image and a right-eye image included in the image based on the reference signal. The reference signal is transmitted to the sync signal generator 230 such that the sync signal generator 230 generates a sync signal to be synchronized with timings of opening and closing shutters of 3D eyeglasses. The sync signal is transmitted to 3D eyeglasses such that the timing of outputting the image at the image output unit 270 is synchronized with the timings of opening and closing the shutters of the 3D eyeglasses. The 3D processor 260 is a separate element in this exemplary embodiment, but it may be included in the image processor 250 in another exemplary embodiment.

The controller 240 controls overall operation of the 3D display apparatus. The controller 240 controls the communication unit 280 to transmit the reference signal to external 3D display apparatuses 295, 296, . . . . The external 3D display apparatuses output image signals based on the received reference signal such that they are synchronized with the timing of outputting the image at the display apparatus according to an exemplary embodiment.

In the above exemplary embodiment, the elements for generating signals and transmitting the signals such as the reference signal generator 220, the sync signal generator 230, and the communication unit 280 are separate elements. However, this is merely an example for convenience of explanation. At least one processor incorporating the functions of the aforementioned elements may be provided according to another exemplary embodiment.

Figure 4:
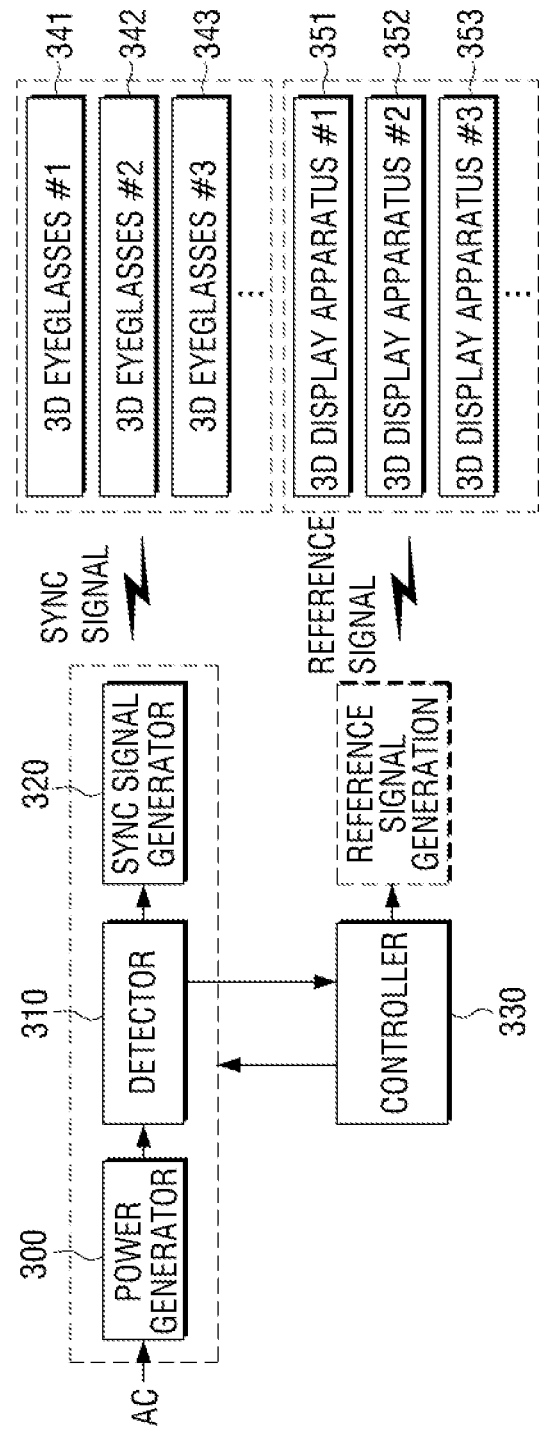
FIG. 4 is a block diagram illustrating a synchronization apparatus according to another exemplary embodiment.

FIG. 4 is a block diagram illustrating a sync signal apparatus according to another exemplary embodiment.

The sync signal apparatus according to another exemplary embodiment includes a power generator 300, a detector 310, a sync signal generator 320, and a controller 330.

The power generator 300 and the detector 310 are the same as those described above. In this exemplary embodiment, the sync signal generator 320 generates a sync signal based on zero crossing points of time detected by the detector 310. The sync signal is a signal for synchronizing one or more pairs of 3D eyeglasses 341, 342, 343, . . . .

The controller 330 generates a reference signal based on the zero crossing point of time detected by the detector 310, and transmits the reference signal to one or more 3D display apparatuses 351, 352, 353, . . . .

As a consequence, timings of outputting images at the plurality of 3D display apparatuses are synchronized with timings of opening and closing shutters of the plurality of pairs of 3D eyeglasses, so that multiple users can enjoy the 3D images comfortably.

Although the reference signal is generated based on the zero crossing points of time detected by the detector 310 in the exemplary embodiment as shown in FIG. 4, the reference signal may be generated at every zero crossing point of time or at some points of time of the zero crossing points of time. For example, the reference signal may be generated one time per 2 periods or 3 periods.

Figure 5:
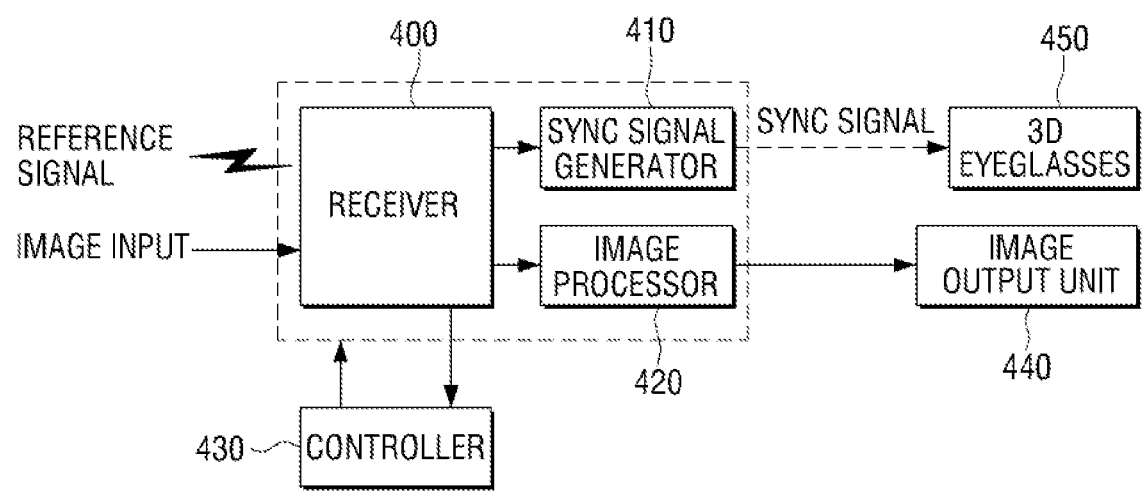
FIG. 5 is a block diagram illustrating a 3D display apparatus which receives a reference signal in a synchronization system according to an exemplary embodiment.

FIG. 5 is a block diagram illustrating a 3D display apparatus which receives a reference signal in a synchronization system according to an exemplary embodiment. The 3D display apparatus included in the synchronization system according to an exemplary embodiment includes a receiver 400, a sync signal generator 410, an image processor 420, a controller 430, and an image output unit 440.

The receiver 400 receives a reference signal and an image and transmits the reference signal to the sync signal generator 410, and transmits an input image and a reference signal to the image processor 420.

The sync signal generator 410 generates a sync signal based on the received reference signal and transmits the sync signal to 3D eyeglasses 450. The sync signal may be transmitted using an infrared ray signal or a radio frequency (RF) signal.

The image processor 420 performs signal processing on the received image such that the image is output based on the reference signal, and transmits the processed image to the image output unit 440.

The image output unit 440 outputs the image signal based on the reference signal. More specifically, if the received image signal is a 3D image, the image output unit 440 outputs a left-eye image and a right-eye image in synchronization with the reference signal.

The controller 430 controls the receiver 400, the sync signal generator 410, and the image processor 420 to perform the above-described overall operation.

Accordingly, the timing of outputting the input image is synchronized with the timing of opening and closing the shutters of 3D eyeglasses, and also, the timing of outputting the image is synchronized with the external display apparatus which has transmitted the reference signal or the external apparatus which has received the reference signal, so that the user can enjoy the 3D image comfortably.

Figure 6A:
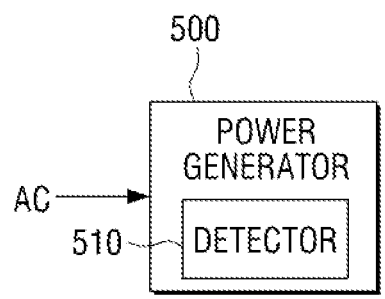
FIG. 6A and FIG. 6B are block diagram illustrating diverse examples of a power generator and a detector included in the synchronization apparatus according to exemplary embodiments.
Figure 6B:
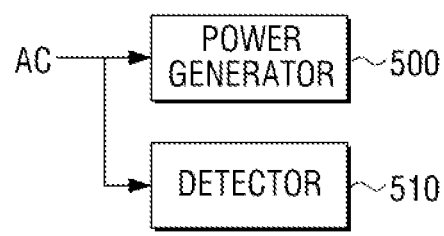

FIGS. 6A and 6B are views illustrating diverse examples of the power generator and the detector included in the synchronization apparatus according to exemplary embodiments.

As shown in FIG. 6A, a power generator 500 may include a detector 510. In this case, the power generator 500 may detect zero crossing points of time based on an input AC power signal.

As shown in FIG. 6B, the power generator 500 and the detector 510 may be provided in parallel. In this case, the detector 510 does not receive an AC power signal via the power generator 500 and receives it directly and detects zero crossing points of time.

In FIGS. 6A and 6B, diverse circuit diagrams of the power generator 500 and the detector 510 are illustrated and, in particular, if the power generator 500 and the detector 510 are provided in parallel, the power generator 500 may be omitted from the 3D display apparatus or the synchronization apparatus according to an exemplary embodiment.

Hereinafter, a process of generating a reference signal according to an exemplary embodiment will be explained with reference to FIGS. 7 and 8.

Figure 7:
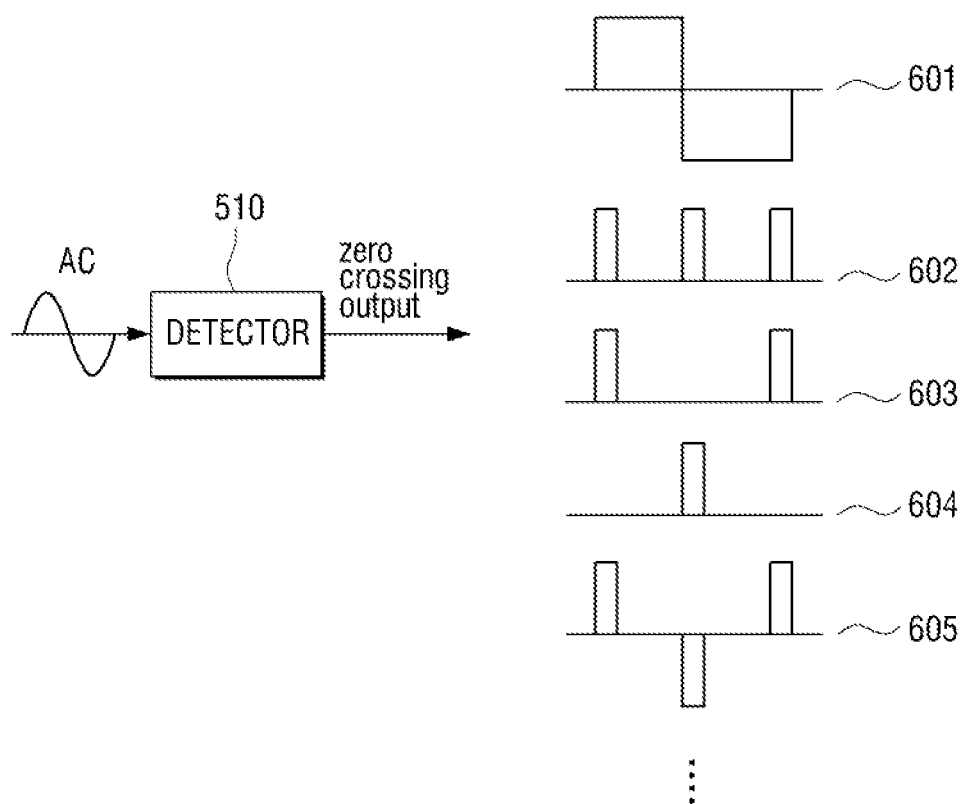
FIG. 7 is a view illustrating an output signal which is output by detecting zero crossing points of time by the detector based on an AC power signal in an synchronization method according to an exemplary embodiment.

FIG. 7 illustrates a method for detecting zero crossing points of time by the detector 510 based on an AC power signal.

The detector 510 generates diverse outputs based on the zero crossing points of time of the AC power signal. That is, the detector 510 may generate a continuous signal during every predetermined period or may generate a discrete signal at a specific time.

Signals of diverse forms 601-605 are output based on the zero crossing points of time detected by the detector 510.

Figure 8:
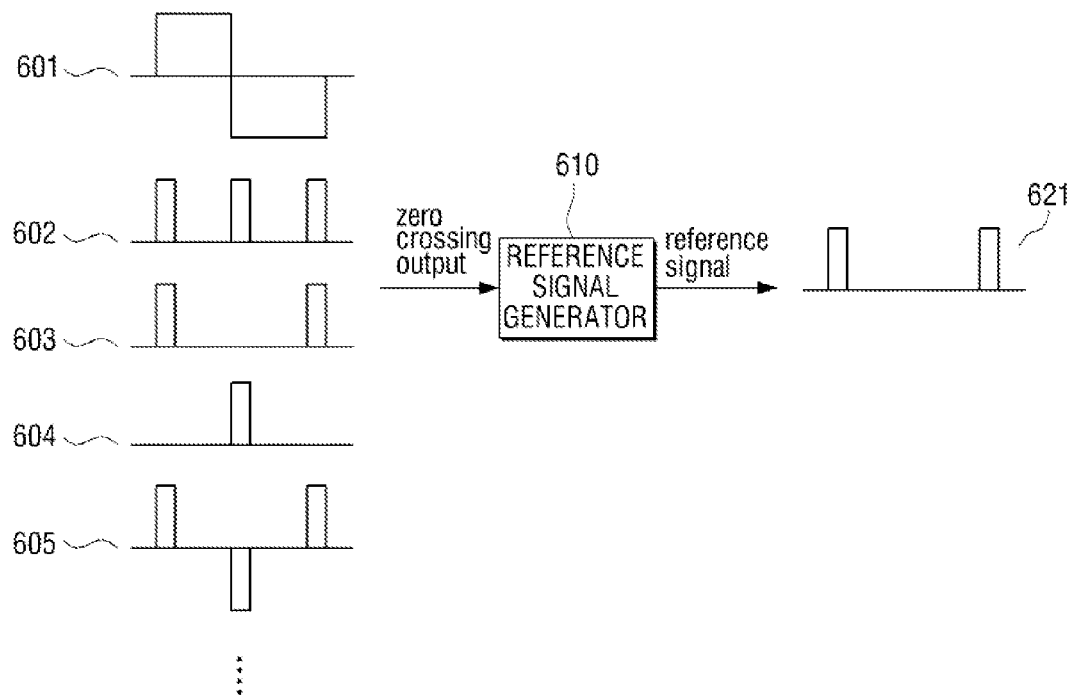
FIG. 8 is a view illustrating a reference signal which is generated from the output signal output by detecting the zero crossing points of time in the synchronization method according to an exemplary embodiment.

FIG. 8 illustrates a process of generating a reference signal based on diverse output values 601-605 output from the detector 510. A reference signal generator 610 generates a reference signal based on the diverse output signals 601 to 605 output from the detector 510.

For example, if a reference signal is set at every zero crossing point of time, the reference signal is generated based on the output signal 602, and, if a reference signal is set for each period, the reference signal is generated based on the output signal 603.

FIG. 8 illustrates a process of generating a reference signal 621 which is set for each period.

Although the reference signal generator 610 is a separate element in FIGS. 7 and 8, the reference signal generator 610 may be omitted if the reference signal is generated at every zero crossing point of time because the output value from the detector 510 may be used as a reference signal.

Hereinafter, a synchronization method according to an exemplary embodiment will be explained in comparison with the related-art method. A plurality of 3D display apparatuses are limited to two 3D TVs for the sake of simplicity.

Figure 9A:
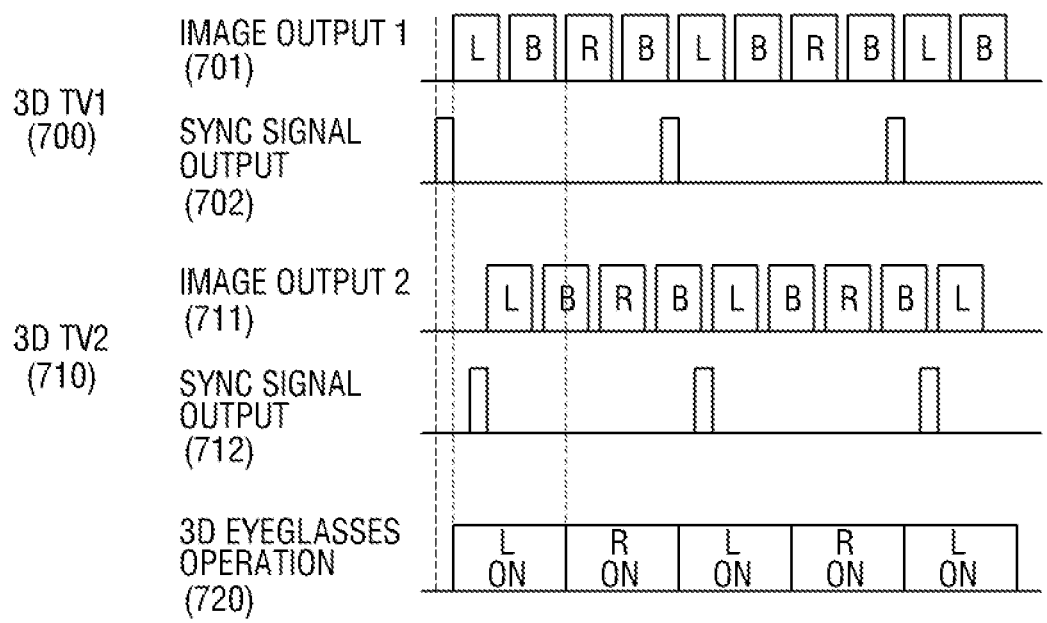
FIGS. 9A and 9B are views to explain an effect achieved by the synchronization method according to an exemplary embodiment.

In the related art method, an image 701 is output from a 3D TV1 700 with a left-eye image and a right-eye image being synchronized with a sync signal 702, as shown in FIG. 9A. In other words, a 3D image is output in a manner that the left-eye image and the right-eye image are output alternately at a time when a first sync signal is output and also are output alternately at a time when a second sync signal is output. A pair of 3D eyeglasses 720 synchronized with the 3D TV1 700 opens a left-eye shutter at the time when the left-eye image is output and opens a right-eye shutter at the time when the right-eye image is output. The timing of opening and closing the shutters of the 3D eyeglasses is based on the sync signal 702 output from the 3D TV1 700.

However, if another display apparatus, a 3D TV2 710, is operated in the same place, an image 711 is output based on a different sync signal 712 even if the image is the same as that of the 3D TV1 100. Therefore, the timing of outputting the image 701 at the 3D TV1 700 is not identical to the timing of outputting the image 711 at the 3D TV2 710.

At this time, if the user wearing the 3D eyeglasses, which operates in synchronization with the sync signal 702 from the 3D TV1 700, sees the 3D TV2 712, the timing of outputting the image 711 is not identical to the timing of opening and closing the shutters of the 3D eyeglasses so that it is difficult to view the 3D image comfortably.

Figure 9B:
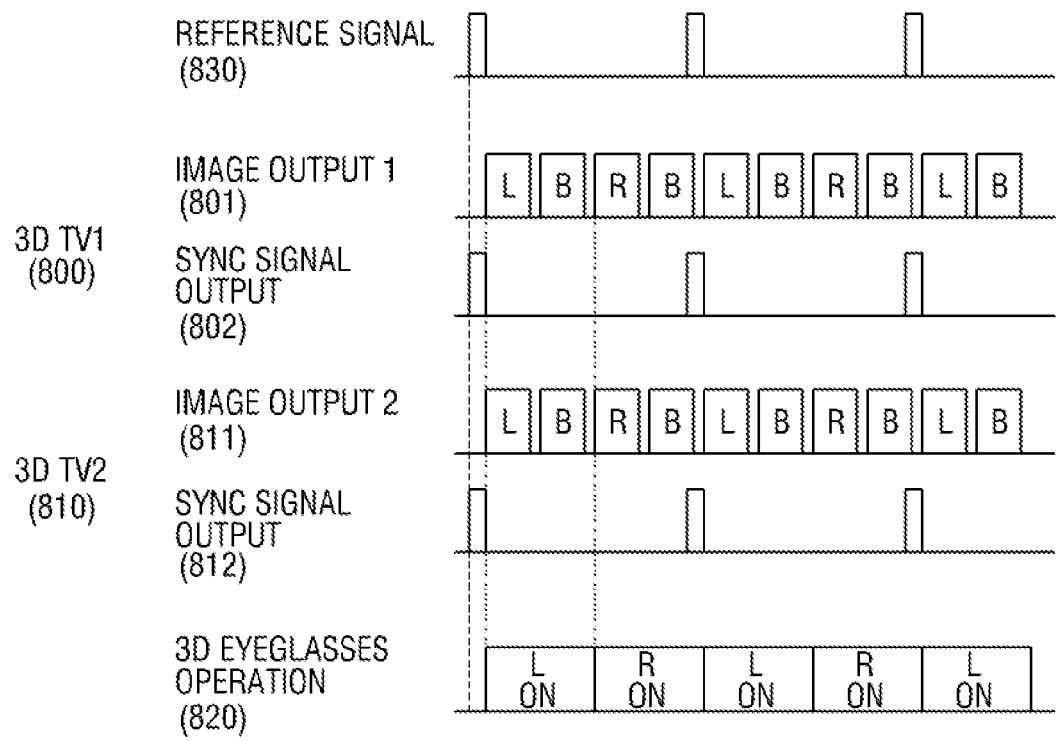

However, according to the synchronization method according to an exemplary embodiment, since a 3D TV1 800 and a 3D TV2 810 output images at the same timing as shown in FIG. 9B, there is no problem in watching 3D images output from the both display apparatuses, irrespective of which of the 3D TV1 800 and the 3D TV2 810 is synchronized with a pair of 3D eyeglasses 820.

More specifically, a reference signal 830 generated in the above-described method is transmitted to the 3D TV1 800 and the 3D TV2 810. The reference signal 830 is a signal that is generated based on zero crossing points of time of the AC voltage signal, and is generated at an external synchronization apparatus and transmitted to the 3D TV1 800 and the 3D TV2 810 in this exemplary embodiment. However, the reference signal may be generated in the 3D TV1 800 and transmitted to the 3D TV2 810 as described above.

Since the 3D TV1 800 outputs a left-eye image and a right-eye image of a 3D image 801 alternately based on the reference signal 830 and the 3D TV2 810 also outputs an image 811 based on the reference signal 830, the timings of outputting images at both the display apparatuses are synchronized with each other. Also, since the operation of the 3D eyeglasses 820 is based on a sync signal generated based on the reference signal 830, the timing of outputting images of the two 3D TVs 800, 810 and the timing of opening and closing the shutters of the 3D eyeglasses 820 are synchronized with each other so that the user can enjoy the 3D image through either one of TVs with the 3D eyeglasses 820.

Hereinafter, diverse examples of the synchronization apparatus according to an exemplary embodiment will be explained with reference to FIGS. 10 and 11. The synchronization apparatus illustrated in FIGS. 10 and 11 has the same configuration as that of the above-described display apparatus or the synchronization apparatus, and some element may be omitted as described above.

Figure 10:
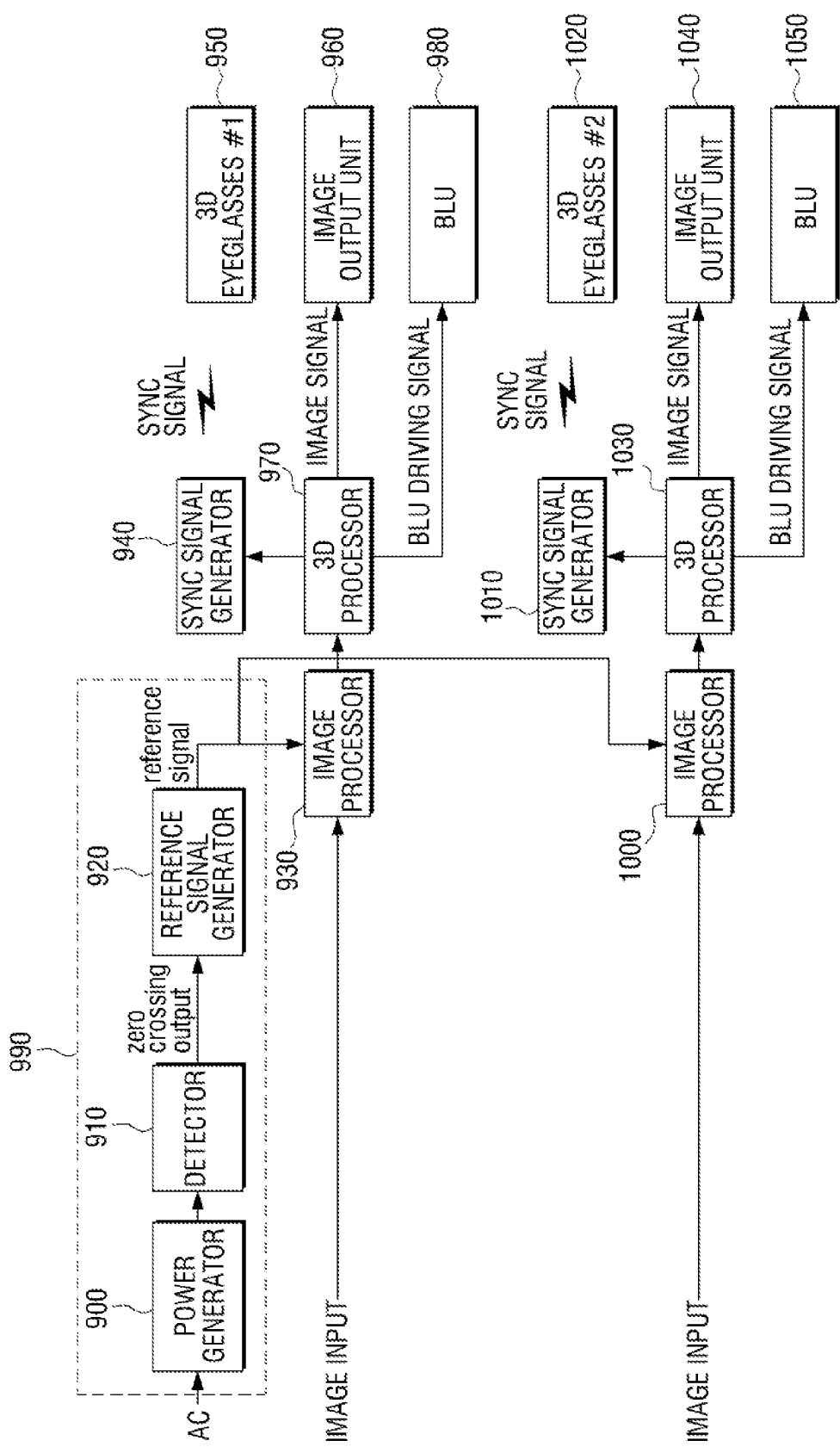
FIG. 10 is a block diagram illustrating a synchronization apparatus according to another exemplary embodiment.

A synchronization apparatus 990 shown in FIG. 10 generates a reference signal and transmits the reference signal to a plurality of 3D display apparatuses, thereby synchronizing timings of outputting images at the 3D display apparatuses which have received the reference signal.

That is, the reference signal generated after going through a power generator 900, a detector 910, and a reference signal generator 920 is transmitted to each of image processors 930, 1000, and each of the display apparatuses outputs a 3D image through each of image output units 960, 1040 based on the reference signal, while transmitting the reference signal to each of sync signal generators 940, 1010 such that the sync signal generators 940, 1010 generate a sync signal based on the reference signal and transmits the sync signal to pairs of 3D eyeglasses 950, 1020.

Accordingly, timings of outputting images at the image output units 960, 1040 of the two 3D display apparatuses are synchronized with timings of opening and closing the shutters of the two pairs of 3D eyeglasses 950, 1020 operating in association with the 3D display apparatuses. In a synchronization apparatus 1190 illustrated in FIG. 11, a reference signal is transmitted to each of 3D display apparatuses and is also transmitted to a sync signal generator 1130. The sync signal generator 1130 generates a sync signal to be transmitted to each of pairs of 3D eyeglasses 1140, 1220 based on the reference signal and transmits the sync signal to each of the pairs of 3D eyeglasses 1140, 1220 to synchronize timings of opening and closing shutters of the 3D eyeglasses.

Figure 11:
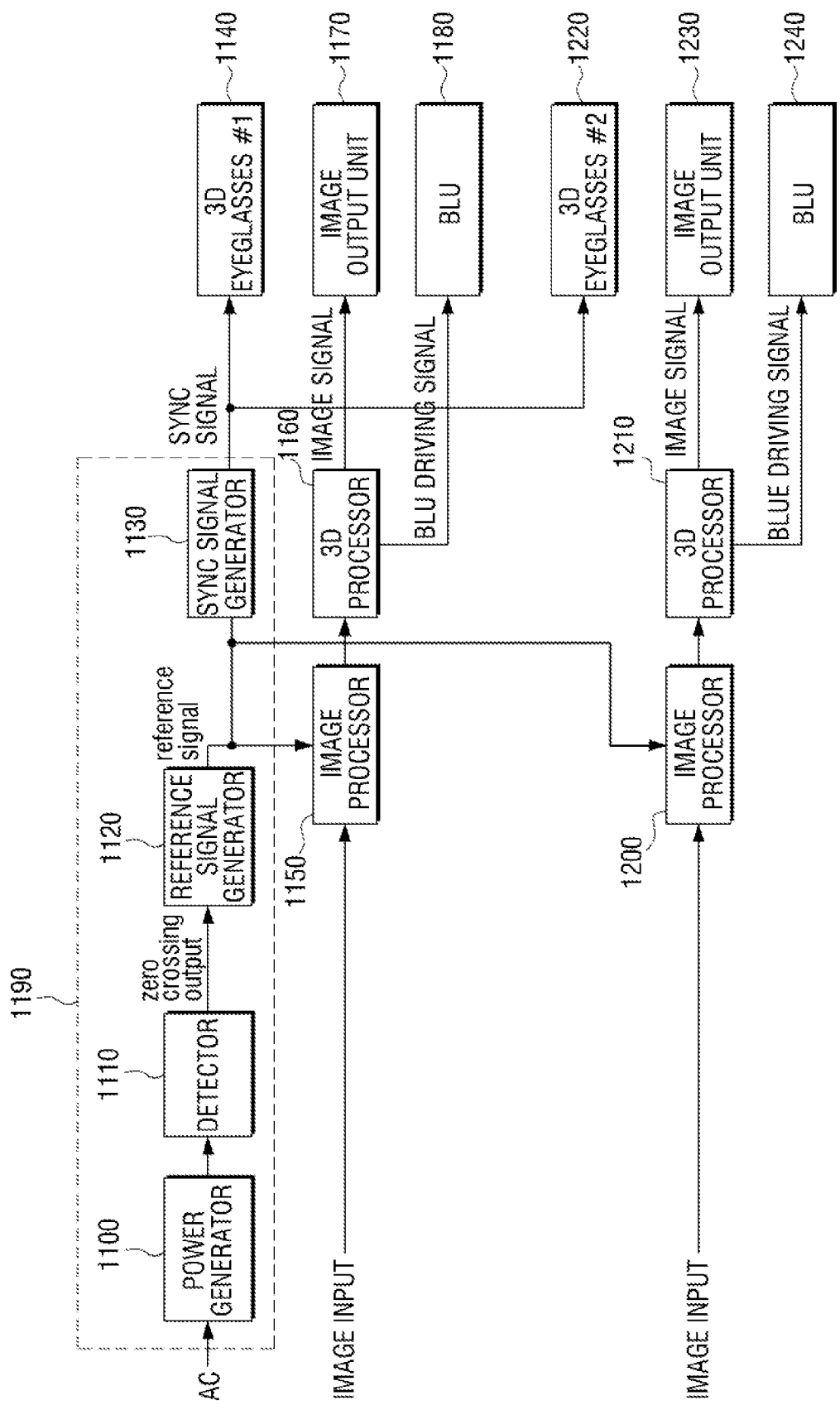
FIG. 11 is a block diagram illustrating a synchronization apparatus according to another exemplary embodiment.

That is, the synchronization apparatus 1190 illustrated in FIG. 11 further includes the sync signal generator 1130 in addition to the configuration of the synchronization apparatus 990 of FIG. 10. Accordingly, a plurality of 3D display apparatuses display 3D images based on the reference signal received from the synchronization apparatus 1190 and are not required to generate a separate sync signal and transmit it to 3D eyeglasses. To this end, the configuration of the 3D display apparatus can be simplified and the user can enjoy the 3D image displayed on any display apparatus using the 3D eyeglasses.

Figure 12:
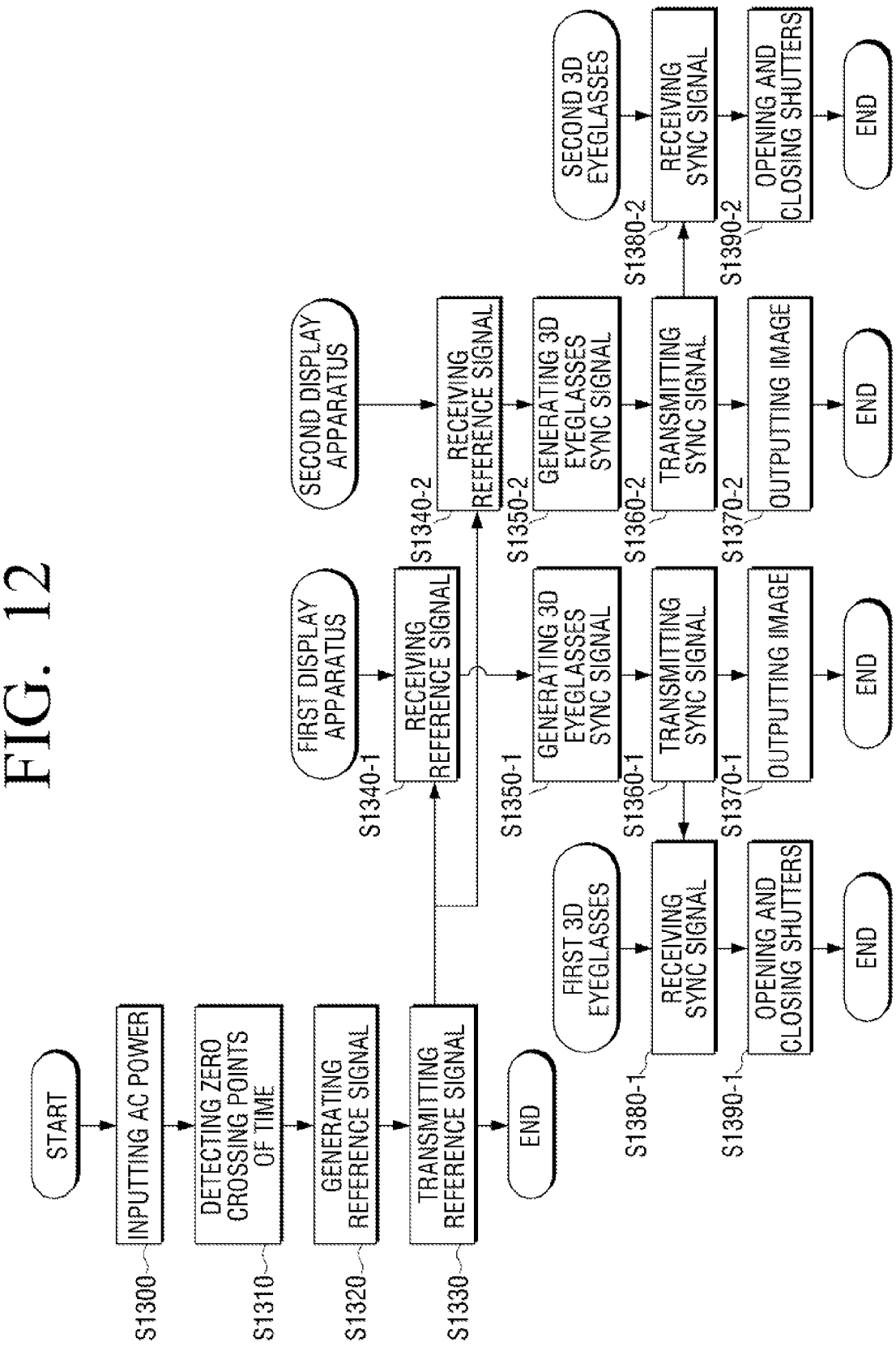
FIG. 12 is a flowchart illustrating a synchronization method according to an exemplary embodiment.

Up to now, diverse apparatuses and configurations thereof according to exemplary embodiments have been described, and a synchronization method will be explained below with reference to FIGS. 12 and 13. According to a synchronization method according to an exemplary embodiment as shown in FIG. 12, AC power is input (S1300) and zero crossing points of time of the AC power signal is detected (S1310). A reference signal is generated based on the detected zero crossing points of time (S1320) and transmitted to a plurality of 3D display apparatuses (S1330). The first display apparatus and the second display apparatus receive the reference signal (S1340-1, S1340-2) and generate 3D eyeglasses sync signals based on the reference signal (S1350-1, S1350-2). The 3D eyeglasses sync signals are transmitted to pairs of 3D eyeglasses operating in association with the respective display apparatuses (S1360-1, S1360-2). The first display apparatus and the second display apparatus output 3D images based on the reference signal at the same time of transmitting the 3D eyeglasses sync signals (S1370-1, S1370-2), thereby providing 3D images for the users. The pairs of 3D eyeglasses operating in association with the first display apparatus and the second display apparatus, respectively, receive the 3D eyeglasses sync signals (S1380-1, S1380-2), and open and close left-eye shutters and right-eye shutters based on the 3D eyeglasses sync signals (S1390-1, S1390-2), thereby allowing users to enjoy a stereoscopic image.

Figure 13:
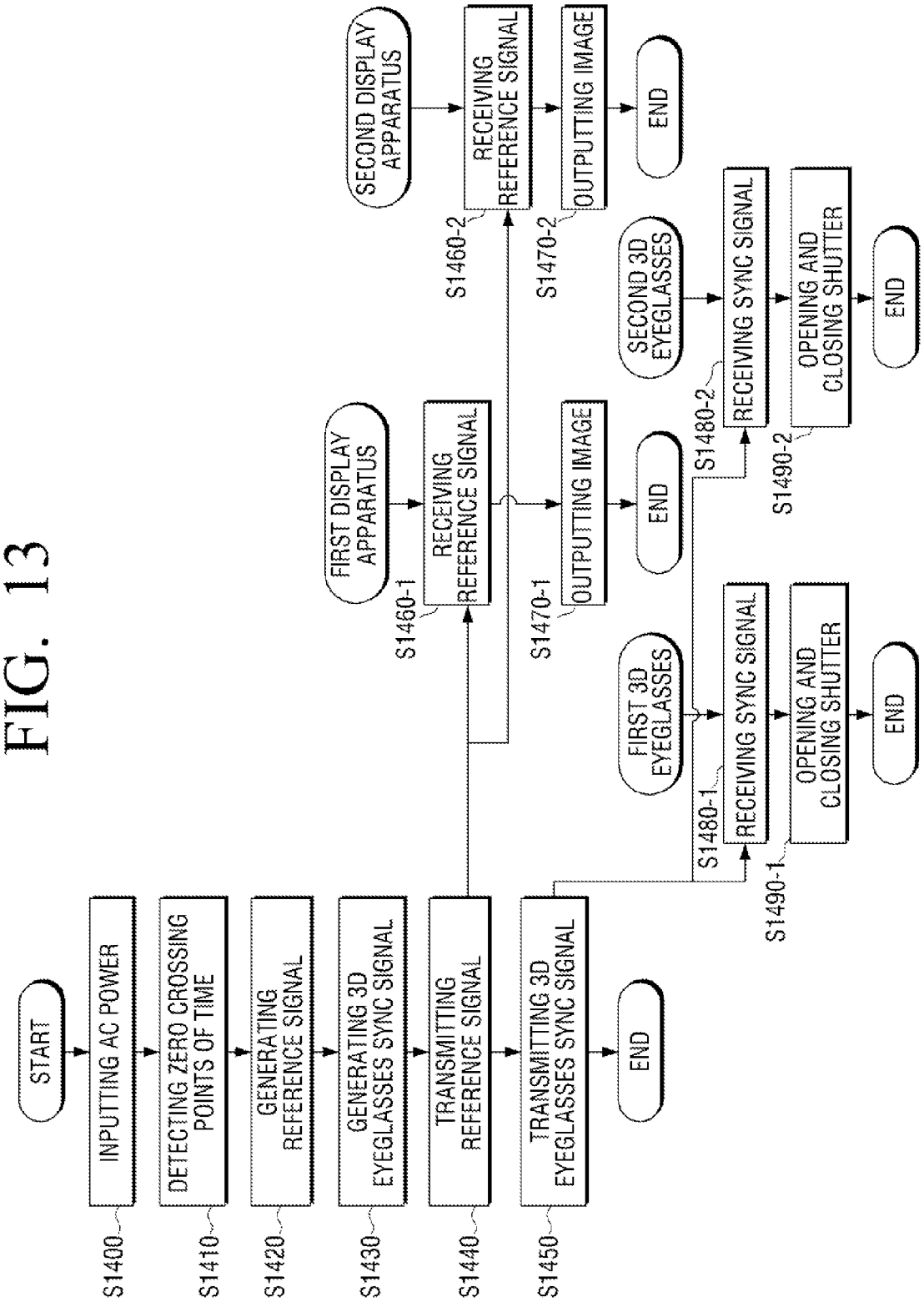
FIG. 13 is a flowchart illustrating a synchronization method according to another exemplary embodiment.

According to a synchronization method according to another exemplary embodiment of the present invention as shown in FIG. 13, AC power is received (S1400) and zero crossing points of time of the AC power is detected (S1410). Based on the detected zero crossing points of time, a reference signal is generated (S1420) and also a sync signal for synchronizing 3D eyeglasses is generated (S1430). Next, the reference signal is transmitted to a first display apparatus and a second display apparatus (S1440), and the sync signal for synchronizing the 3D eyeglasses is also transmitted to a first pair of 3D eyeglasses and a second pair of 3D eyeglasses operating in association with the first and the second display apparatuses, respectively (S1450).

The first display apparatus and the second display apparatus receive the reference signal (S1460-1, S1460-2), and output a left-eye image and a right-eye image alternately based on the reference signal (S1470-1, S1470-2), thereby providing stereoscopic images for the user.

The first pair of 3D eyeglasses and the second pair of 3D eyeglasses operating in association with the first display apparatus and the second display apparatus, respectively, receive the sync signal (S1480-1, S1480-2), and open and close left-eye shutters and right-eye shutters based on the sync signal (S1490-1, S1490-2), thereby providing a stereoscopic image for the users.

In the above exemplary embodiments, the plurality of display apparatuses are limited to two apparatuses, but this is merely an example for the convenience of explanation and should not be considered as limiting taking into account the aspect and the principle of the present disclosure, and it is obvious to an ordinary skilled person in the related art that the number of display apparatus is variable.

Also, the display apparatus is described as a 3D TV in the above exemplary embodiments, but any display apparatus can be applied if it can provide a 3D image.

According to the apparatus, method, and system for synchronization and the 3D display apparatus using the same according to diverse exemplary embodiments, a plurality of 3D display apparatuses are synchronized and output correct 3D images.

Also, since the timings of opening and closing the shutters of the plurality of pairs of 3D eyeglasses, which operate in association with the plurality of 3D display apparatuses, is synchronized with the timings of outputting images at the plurality of display apparatuses, the user can watch correct 3D image even if a plurality of 3D images are displayed.

The foregoing exemplary embodiments and advantages are merely exemplary and are not to be construed as limiting. The inventive concept can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A three-dimensional (3D) display apparatus comprising:
   a power generator which generates power based on a received alternating current (AC) power signal;
   a detector which detects zero crossing points of time of the received AC power signal; and
   a controller which generates a reference signal based on the detected zero crossing points of time and transmits the reference signal to at least one other 3D display apparatus,
   wherein the zero crossing points of time of the received AC power signal are points of time at which the AC voltage is 0V at a moment when the AC voltage changes from positive (+) to negative (−) or from negative (−) to positive (+), and
   wherein the controller outputs an image based on the generated reference signal.

2. The 3D display apparatus as claimed in claim 1, wherein the reference signal corresponds to at least some of the detected zero crossing points of time.

3. The 3D display apparatus as claimed in claim 1, wherein the controller generates a sync signal for synchronizing a timing of opening and closing shutters of 3D eyeglasses based on the generated reference signal, and transmits the sync signal to the 3D eyeglasses.

4. The 3D display apparatus as claimed in claim 1, wherein the reference signal is a signal for synchronizing a timing of outputting an image at the at least one other 3D display apparatus.

5. The 3D display apparatus as claimed in claim 1, wherein the reference signal is a signal for synchronizing shutters of each pair of 3D eyeglasses operating in association with the at least one other 3D display apparatus.

6. A synchronization apparatus comprising:
   a power generator which generates power based on a received AC power signal;
   a detector which detects zero crossing points of time of the received AC power signal; and a controller which generates a reference signal for synchronizing timings of outputting images of a plurality of 3D display apparatuses based on the detected zero crossing points of time, and transmits the reference signal to the plurality of 3D display apparatuses, wherein the zero crossing points of time of the received AC power signal are points of time at which the AC voltage is 0V at a moment when the AC voltage changes from positive (+) to negative (−) or from negative (−) to positive (+), and wherein the controller outputs an image based on the generated reference signal.

7. The synchronization apparatus as claimed in claim 6, wherein the reference signal corresponds to at least some of the detected zero crossing points of time.

8. The synchronization apparatus as claimed in claim 6, further comprising a sync signal generator which generates a sync signal for synchronizing display timings of the plurality of 3D display apparatuses with timings of opening and closing shutters of a plurality of pairs of 3D eyeglasses, wherein the controller transmits the generated sync signal to each of the plurality of pairs of 3D eyeglasses.

9. A synchronization method, comprising:

receiving an AC power signal;

detecting zero crossing points of time of the AC power signal;

generating a reference signal based on the detected zero crossing points of time;

transmitting the reference signal to at least one display apparatus; and outputting an image based on the e generated reference signal, wherein the zero crossing points of time of the received AC power signal are points of time at which the AC voltage is 0V at a moment when the AC voltage changes from positive (+) to negative (−) or from negative (−) to positive (+).

10. The synchronization method as claimed in claim 9, wherein the reference signal corresponds to at least some of the detected zero crossing points of time.

11. The synchronization method as claimed in claim 9, wherein the reference signal is a signal for synchronizing a timing of outputting an image at the at least one 3D display apparatus.

12. The synchronization method as claimed in claim 9, further comprising generating a sync signal for synchronizing a display timing of the at least one 3D display apparatus with a timing of opening and closing shutters of at least one pair of 3D eyeglasses operating in association with the at least one 3D display apparatus based on the reference signal, wherein the transmitting comprises transmitting the generated sync signal to the at least one pair of 3D eyeglasses.

13. The synchronization method as claimed in claim 12, wherein the sync signal corresponds to at least some of the detected zero crossing points of time.

14. The synchronization method as claimed in claim 9, wherein the generating the reference signal comprises a first display device generating the reference signal, and the method further comprises:

a second display device receiving the reference signal from the first display device; and displaying a 3D image based on the received reference signal.

15. A synchronization system comprising:

a first display apparatus which generates a reference signal based on zero crossing points of time of a received AC power signal, and transmits the generated reference signal to a second display apparatus; and the second display apparatus which receives the reference signal and displays an image based on the received reference signal, wherein the zero crossing points of time of the received AC power signal are points of time at which the AC voltage is 0V at a moment when the AC voltage changes from positive (+) to negative (−) or from negative (−) to positive (+).

16. The synchronization system as claimed in claim 15, wherein the reference signal is a signal for synchronizing an image display timing of the first display apparatus with an image display timing of the second display apparatus.

17. The synchronization system as claimed in claim 15, wherein the first display apparatus generates a sync signal for synchronizing timings of opening and closing shutters of at least one pair of 3D eyeglasses operating in association with one of the first display apparatus and the second display apparatus based on the reference signal, and transmits the sync signal to the at least one pair of 3D eyeglasses.

18. The synchronization system as claimed in claim 15, wherein the second display apparatus generates a sync signal for synchronizing timings of opening and closing shutters of at least one pair of 3D eyeglasses operating in association with one of the first display apparatus and the second display apparatus based on the reference signal, and transmits the sync signal to the at least one pair of 3D eyeglasses.

19. The synchronization system as claimed in claim 15, wherein the first display apparatus and the second display apparatus are display apparatuses to display a 3D image, wherein the image is a 3D image.

20. A synchronization system comprising:

a synchronization apparatus comprising:

a power generator which receives an alternating current (AC) power signal, a detector which detects zero crossing points of the AC power signal, and a controller which generates a reference signal corresponding to the detected zero crossing points;

a first three-dimensional (3D) display device, comprising:

a receiver which receives the reference signal, an image processor which outputs a processed image such that a timing of left-eye and right-eye portions of the output image correspond to the reference signal, wherein the zero crossing points of time of the received AC power signal are points of time at which the AC voltage is 0V at a moment when the AC voltage changes from positive (+) to negative (−) or from negative (−) to positive (+), and wherein the controller outputs an image based on the generated reference signal.

21. The synchronization system as claimed in claim 20, further comprising:

a second 3D display device comprising:

the synchronization apparatus, an image processor which outputs a processed image such that a timing of left-eye and right-eye portions of the output image correspond to the reference signal, a sync signal generator which outputs a sync signal having a timing corresponding to the reference signal.

22. The synchronization system as claimed in claim 20, wherein the synchronization apparatus further comprises a sync signal generator which outputs a sync signal having a timing corresponding to the reference signal.

23. The synchronization system as claimed in claim 20, wherein the first 3D display device further comprises a sync signal generator which outputs a sync signal having a timing corresponding to the reference signal.

24. The synchronization system as claimed in claim 21, further comprising a pair of 3D glasses which receive the sync signal and open and close shutters based on the sync signal.

25. The synchronization system as claimed in claim 22, further comprising a pair of 3D glasses which receive the sync signal and open and close shutters based on the sync signal.

26. The synchronization system as claimed in claim 23, further comprising a pair of 3D glasses which receive the sync signal and open and close shutters based on the sync signal.

* * * * *